Oct. 29, 1957

M. W. WOLFE 2,810,931

COLLAPSIBLE SECTIONAL AIRBAG

Filed June 24, 1955

INVENTOR.
MERRITT W. WOLFE

BY

*R. L. Miller*
ATTORNEY

Oct. 29, 1957

M. W. WOLFE 2,810,931

COLLAPSIBLE SECTIONAL AIRBAG

Filed June 24, 1955

INVENTOR.
MERRITT W. WOLFE

BY

*R. L. Miller*
ATTORNEY

2,810,931
COLLAPSIBLE SECTIONAL AIRBAG

Merritt W. Wolfe, Akron, Ohio, assignor to The Goodyear Tire & Rubber Company, Akron, Ohio, a corporation of Ohio Application June 24, 1955, Serial No. 517,760

6 Claims. (Cl. 18—45)

This invention relates to a sectional or segmental airbag used to maintain internal pressure against a repaired portion of a tire carcass during the vulcanizing operation. More particularly, the invention relates to a segmental airbag which is readily insertible into a repaired tire carcass having a larger internal transverse sectional diameter than bead diameter.

An object of the invention is to provide a sectional airbag assembly which can be readily inserted into a tire having a bead diameter of smaller dimension than the internal transverse sectional diameter.

Another object of the invention is to provide an airbag which is readily foldable along a longitudinal medial plane so as to reduce the transverse sectional diameter thereof and enable the bag to be inserted into a tire having a bead diameter of smaller dimension than the internal transverse sectional diameter.

Referring to the drawings which disclose a preferred embodiment of the invention:

Figure 1:
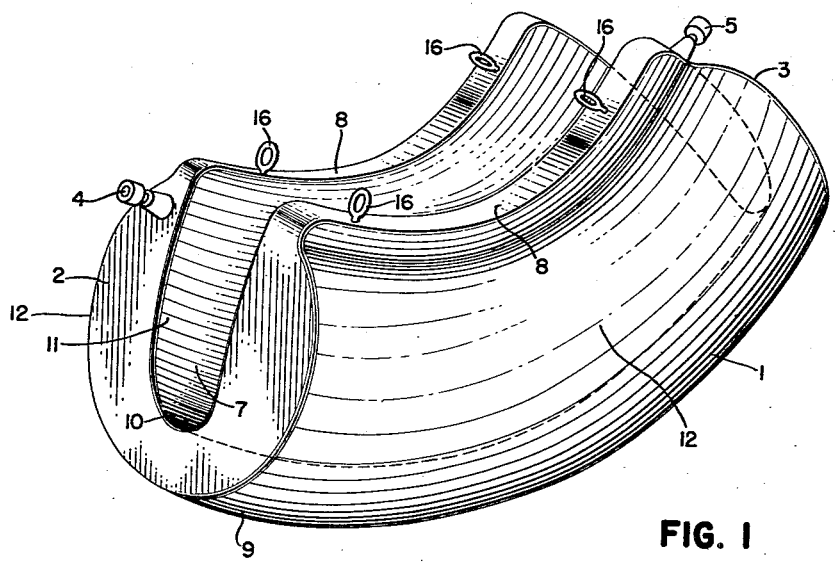
Fig. 1 is an isometric view of the preferred embodiment of the sectional airbag of this invention.

Referring to the drawings, the airbag of this invention comprises a body portion 1 of generally arcuate shape longitudinally terminating in ends 2 and 3.

The bag 1 may be made of rubber material reinforced with fabric and capable of sustaining great pressure. The thickness of the walls of the bag is such that the bag will retain its molded position when deflated, or otherwise stated, the bag is relatively rigid.

The end 2 is provided with a valve 4 for introducing air, steam or other fluid into the bag, and the end 3 is provided with an outlet valve 5 and hose 6 for draining the bag. The bag is provided with a concavity or longitudinally-extending groove 7 projecting from the inner circumference or base 8 radially toward the crown 9 of the bag. The groove 7 is symmetrical in cross section with the medial plane of the bag and extends for the complete longitudinal length of the bag radially toward the crown 9 for a substantial portion of the radial sectional diameter of the bag, represented by R in Fig. 3 of the drawings. It is seen, then, that in cross section the bag is bifurcated or substantially U-shaped with the distance between the base 10 of the groove and the crown 9 being less than the distance between the parallel walls 11 of the groove and the sidewalls 12 of the bag.

Figure 2:
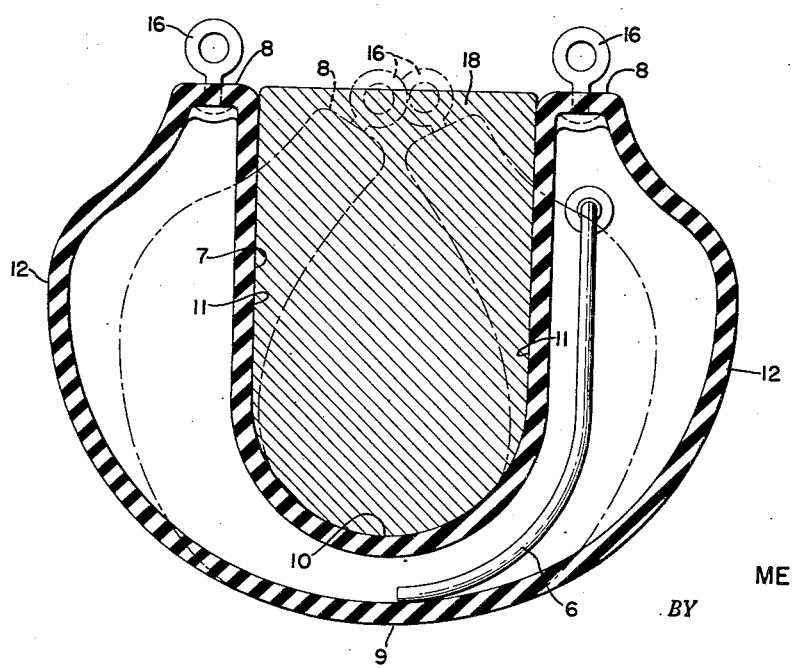
Fig. 2 is a cross-sectional view of the airbag and filler showing in phantom lines the airbag in collapsed or folded position.

This cross sectional form permits the bag to be folded or collapsed along the medial plane thereof by transversely compressing or forcing together each base 8 of the bag. As illustrated in phantom lines in Fig. 2 the bag has a substantially lesser sidewall diameter when folded or collapsed which permits the bag to be inserted into a tire of lesser bead diameter than internal sectional diameter as hereinafter described.

Figure 3:
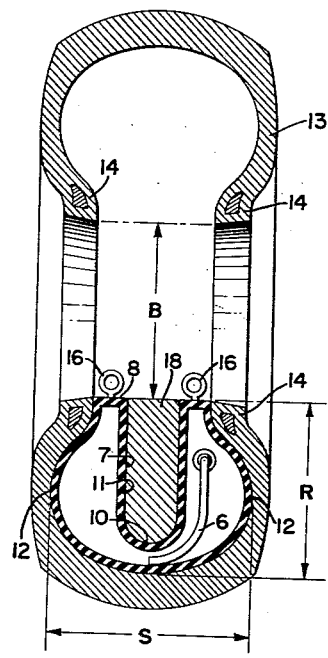
Fig. 3 is a sectional view of the airbag and filler in position within a tire carcass.

The outer wall of the bag formed by the crown 9 and sidewalls 12 is contoured to substantially the same cross sectional shape as the internal surface of the tire 13 to be repaired which has an internal transverse sectional diameter S, shown in Fig. 3, substantially greater than the diameter B of the beads 14.

Figure 4:
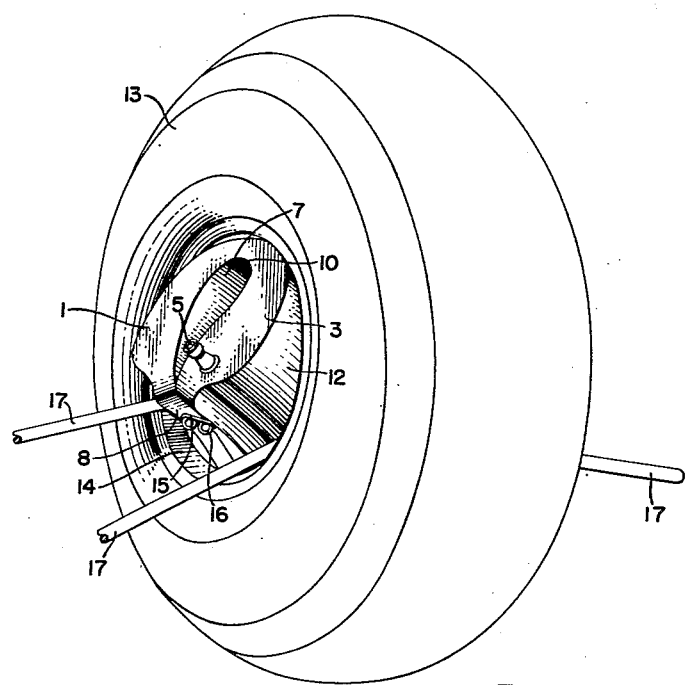
Fig. 4 is an isometric view showing the airbag of this invention in folded position being inserted longitudinally past the beads of a tire carcass.
Figure 5:
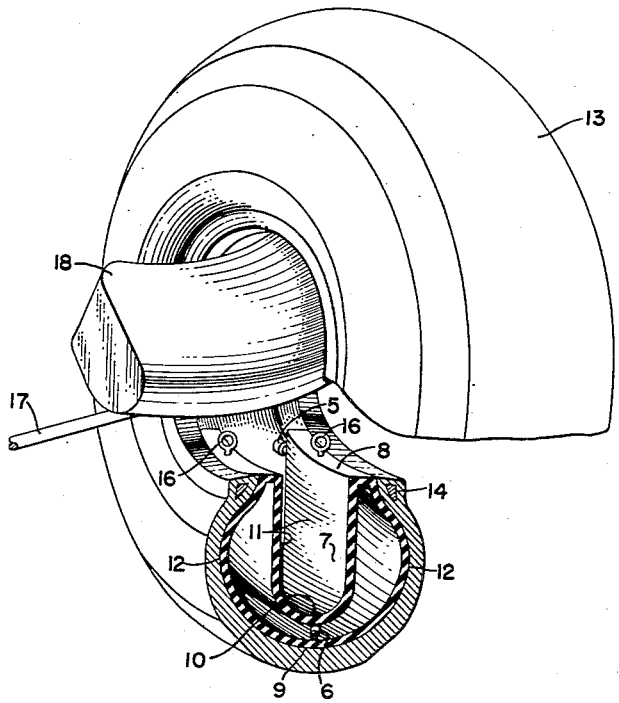
Fig. 5 is an isometric view with parts broken away showing the airbag of this invention in position within the tire and showing the filler being longitudinally inserted past the beads of the tire.

In use, the bag 1 is folded along the longitudinal medial plane thereof and secured in folded position by suitable clamps 15 connecting eyebolts 16 which are secured to each inner circumference or base 8. With the bag in folded position, the beads 14 of the tire carcass 13 which is to be repaired, are spread by suitable spreading tools 17 and the folded bag is longitudinally inserted past the beads of the tire as shown in Fig. 4 of the drawings. After the bag has been positioned within the tire, as shown in Fig. 5 of the drawings, the clamps 15 are removed from the eye bolts 16 so as to unfold the airbag, or permit the bag to return to its molded position, and the filler 18 is longitudinally passed through the bead opening of the tire and inserted into the groove 7 of the airbag 1. The filler 18 is made of a solid material, preferably metallic, and has substantially the same cross sectional configuration as the groove 7.

With the bag and filler assembled in the position shown in Fig. 3 the bag is inflated through the valve 4 whereby substantially uniform pressure is exerted on the inner surface of the tire carcass, to force the outer surface of the carcass against the repair mold, not shown.

While certain representative embodiments and details have been shown for the purpose of illustrating the invention, it will be apparent to those skilled in this art that various changes and modifications may be made therein without departing from the spirit or scope of the invention.

I claim:

1. A sectional repair bag assembly for use in curing tires having a larger sidewall diameter than bead diameter comprising an inflatable segmental bag having a longitudinal concavity extending radially from the inner circumference toward the crown for a distance greater than one-half the radial sectional diameter of the bag, means for holding the radially inner portions of said bag together to substantially reduce the sidewall diameter thereof whereby the bag may be inserted into the tire to be cured and a rigid core adapted to be inserted into said concavity after the bag has been positioned in the tire.

2. A sectional repair bag assembly for use in curing tires having a larger sidewall diameter than bead diameter as claimed in claim 1 in which the distance between the bottom of the concavity and the crown of the bag is less than the distance between each side of the concavity and the adjacent sidewall of the bag.

3. A sectional repair bag assembly for use in curing tires having a larger sidewall diameter than bead diameter as claimed in claim 1 in which the concavity is uniform in depth and opens toward the inner circumference forming a U-shaped cross section for the entire length of the bag.

4. A sectional repair bag assembly for use in curing tires having a larger sidewall diameter than bead diameter as claimed in claim 1 in which the sidewalls of the concavity are parallel and the outer surface of the bag has a cross section similar to the cross section of the internal surface of the tire to be cured.

5. A sectional repair bag assembly for use in curing tires having a larger sidewall diameter than bead diameter as claimed in claim 1 in which the rigid core has a cross section substantially the same as the cross section of said concavity.

6. A sectional repair bag assembly for use in curing tires having a larger sidewall diameter than bead diameter as claimed in claim 1 in which said holding means are secured to the inner circumferential surface of said bag and project radially inwardly from said surface.

References Cited in the file of this patent

UNITED STATES PATENTS

| | | |
|---|---|---|
| 1,400,219 | Huetter | Dec. 13, 1921 |
| 1,705,083 | Burke | Nov. 12, 1929 |
| 2,138,585 | Pilblad | Nov. 29, 1938 |

FOREIGN PATENTS

| | | |
|---|---|---|
| 128,349 | Australia | July 29, 1948 |